United States Patent
Anderson et al.

(10) Patent No.: US 12,010,090 B2
(45) Date of Patent: Jun. 11, 2024

(54) MANAGEMENT OF DOMAIN NAME SERVICES ACROSS MULTIPLE DEVICE AND SOFTWARE CONFIGURATIONS

(71) Applicant: Tailscale Inc., Toronto (CA)

(72) Inventors: David Anderson, Victoria (CA); David J. Crawshaw, Berkeley, CA (US)

(73) Assignee: Tailscale Inc., Toronto (CA)

( * ) Notice: Subject to any disclaimer, the term of this patent is extended or adjusted under 35 U.S.C. 154(b) by 0 days.

(21) Appl. No.: 17/740,562

(22) Filed: May 10, 2022

(65) Prior Publication Data
US 2023/0188494 A1 Jun. 15, 2023

Related U.S. Application Data

(60) Provisional application No. 63/288,984, filed on Dec. 13, 2021.

(51) Int. Cl.
*H04L 29/06* (2006.01)
*H04L 41/0803* (2022.01)
*H04L 61/4511* (2022.01)
*H04L 61/5007* (2022.01)

(52) U.S. Cl.
CPC ...... *H04L 61/4511* (2022.05); *H04L 41/0803* (2013.01); *H04L 61/5007* (2022.05)

(58) Field of Classification Search
CPC ............. H04L 61/4511; H04L 61/5007; H04L 41/0803
See application file for complete search history.

(56) References Cited

U.S. PATENT DOCUMENTS

| | | | | |
|---|---|---|---|---|
| 10,243,919 B1* | 3/2019 | Suresh | ................ | H04L 67/1001 |
| 10,735,370 B1* | 8/2020 | Kandlur | .................. | G06F 9/542 |
| 2015/0295882 A1* | 10/2015 | Kaliski, Jr. | ......... | H04L 61/4511 709/217 |
| 2019/0238498 A1* | 8/2019 | Cleary | ..................... | H04L 63/08 |
| 2020/0133527 A1* | 4/2020 | Zhao | ....................... | G06F 3/067 |
| 2021/0136106 A1* | 5/2021 | Balasubramaniam | ....................... | H04L 63/0236 |
| 2022/0191165 A1* | 6/2022 | Zhu | ....................... | H04W 48/18 |

FOREIGN PATENT DOCUMENTS

WO WO-2013150543 A2 * 10/2013 ............. H04L 29/08

* cited by examiner

*Primary Examiner* — Christopher B Robinson (57) ABSTRACT

Described herein are systems, methods, and software to manage nameservers for domain name system (DNS) requests. In one implementation, a computing element receives a domain name system (DNS) configuration from a coordination service that includes a plurality of rules. The computing element identifies an operating system configuration on the computing element and maps each of the rules to local rule implementations on the computing element based on the operating system configuration. Once the local rule implementations are identified, the computing element applies the local rule implementations on the computing element.

14 Claims, 7 Drawing Sheets

MANAGEMENT OF DOMAIN NAME SERVICES ACROSS MULTIPLE DEVICE AND SOFTWARE CONFIGURATIONS

RELATED APPLICATIONS

This application is related to and claims priority to U.S. Provisional Patent Application No. 63/288,984, entitled "MANAGEMENT OF DOMAIN NAME SERVICES ACROSS MULTIPLE DEVICE AND SOFTWARE CONFIGURATIONS," filed on Dec. 13, 2021, and which is hereby incorporated by reference in its entirety.

TECHNICAL BACKGROUND

In computing networks, domain name system (DNS) requests are used by computing elements to identify internet protocol (IP) addresses associated with domain names. For example, a computing element, such as a desktop computer, may generate a DNS request with a uniform resource locator (URL) that is provided to a DNS resolver. The DNS resolver may then forward the request to a nameserver, which returns an IP address associated with the URL. Once the IP address is received, the computing element may request and receive the required data from the destination service that corresponds to the obtained IP address.

Although DNS requests may be resolved using a single resolver, issues can arise when administrators or users desire the use of multiple nameserver in association with different domains or URLs. For example, an organization may desire that DNS requests associated with a specific domain are resolved using a first nameserver, while DNS requests associated with other domains are resolved using a second nameserver. However, configuration challenges can exist when a nameserver configuration is desired to be deployed across multiple devices with various hardware and software configurations.

SUMMARY

The technology described herein manages nameserver rules for domain name system (DNS) requests across multiple hardware and/or software configurations. In one implementation, a method includes receiving a DNS configuration from a coordination service at a computing element, wherein the DNS configuration comprises a plurality of rules. The method further includes identifying an operating system configuration on the computing element and, for each rule of the plurality of rules in the DNS configuration, mapping the rule to a local rule implementation for the computing element based on the operating system configuration on the computing element. Once identified, the method also provides applying the local rule implementations in the computing element.

DETAILED DESCRIPTION

Figure 1:
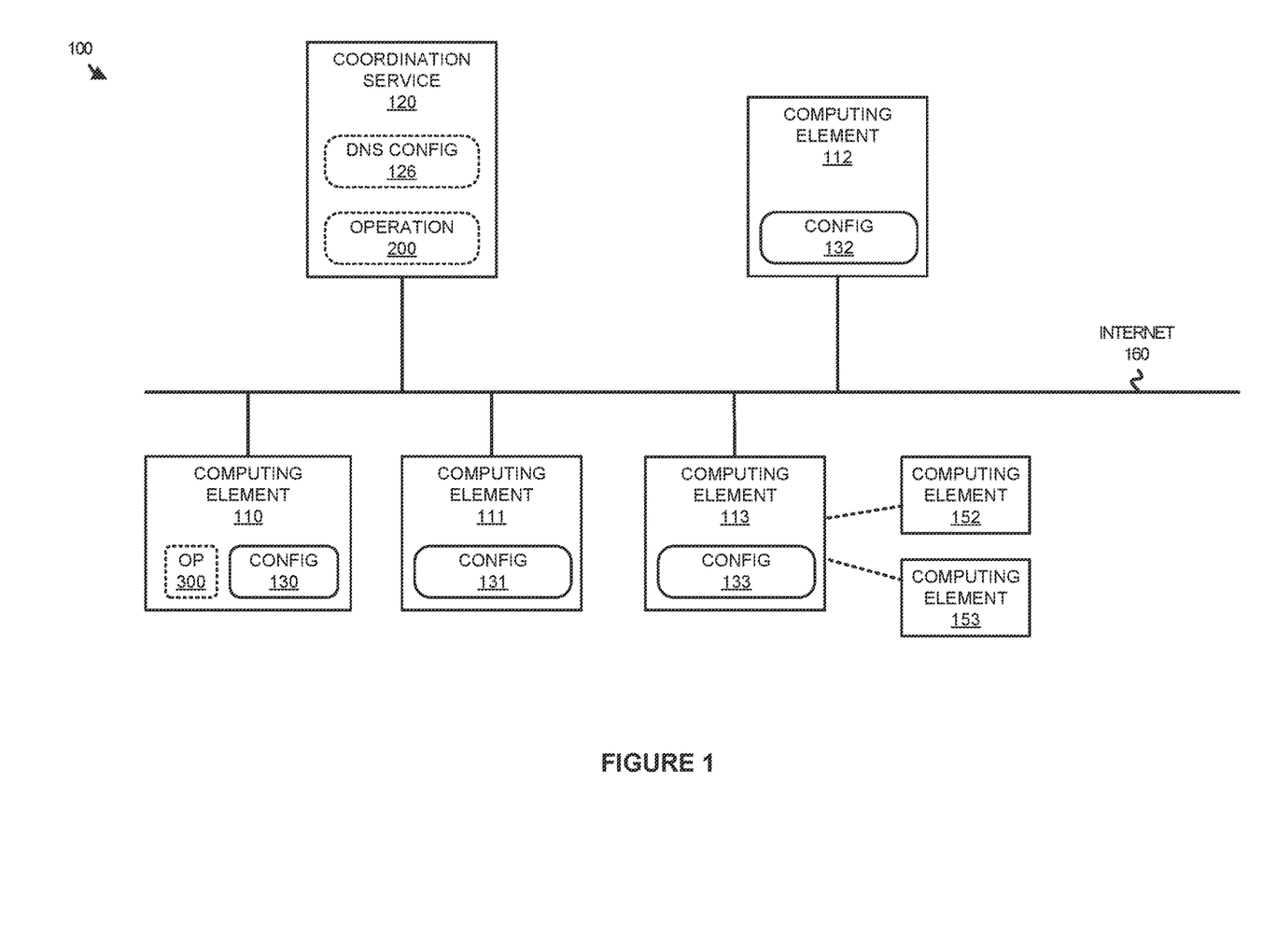
FIG. 1 illustrates a computing environment to manage domain name nameservers for domain name system (DNS) requests according to an implementation.

FIG. 1 illustrates a computing environment 100 to manage domain name nameservers for domain name system (DNS) requests according to an implementation. Computing environment 100 includes coordination service 120, and computing elements 110-113 and 152-153. Coordination service 120 further includes DNS configuration 126 and provides operation 200 that is further described below in FIG. 2. Computing elements 110-113 further include configurations 130-133 and computing element 110 further provides operation 300 that is described below in FIG. 3. Computing elements 110-113 and coordination service 120 communicate via the internet 160.

In computing environment 100, computing elements 110-113 are deployed that can provide various operations, wherein computing elements 110-113 may comprise physical computing systems or virtual computing systems, such as virtual machines. The computing elements may represent user computing systems, servers, or some other computing element. These computing elements may require network communications to communicate with external devices and servers over the internet or other network. When a communication is required, a DNS request can be generated that is used to obtain an internet protocol (IP) address associated with a uniform resource locator (URL). For example, computing element 110 may include a web browser that generates a DNS request for a URL. To identify the IP address, computing element 110 may resolve the association locally, using a local database on the computing element, or may resolve the association remotely using external service or nameservers. The resolution of the URL to the IP address may be based on the configuration of the computing element, wherein settings on the computing element may determine how the request is resolved (e.g., locally, a resolution service, and the like).

Here, computing elements 110-113 may communicate with coordination service 120 to apply a DNS configuration that specifies nameservers associated with DNS requests. Coordination service 120 may receive administrator preferences to create the DNS configuration associated with a set of computing elements and may distribute the DNS configuration to the set of computing elements. In at least one implementation, an administrator may associate domains with nameservers that should be used to resolve DNS queries with the domains. For example, a first domain "www.serviceA.com" may be assigned to be resolved using a first nameserver at a first IP address, while a second domain "www.serviceB.com" may be assigned to be resolved using a second nameserver at a second IP address. Each association may be referred to as a rule, wherein the rule associates one or more domains with a nameserver. Once the preferences are provided by the administrator, the DNS configuration is generated as one or more files that can be distributed to computing elements associated with coordination service 120. For example, computing element 110 may register with coordination service 120 and coordination service 120 may provide DNS configuration 126 identified for computing element 110.

Once DNS configuration 126 is provided to computing element 110, computing element 110 may determine how to apply the rules in DNS configuration 126. In some implementations, computing element 110 may determine operating system configuration information associated with computing element 110 to determine how to translate or map the rules from DNS configuration 126 into local rule implementations that can be applied on the computing element. The local rule implementations may indicate that the rules must be applied in the operating system, must be applied in an application outside of the operating system, or must be applied in some combination thereof. In some examples, operating systems may permit different nameservers to be associated with different domain names, while other operating systems may not permit multiple nameservers to be configured for different domains. Thus, rather than configuring the network settings of the operating system, DNS requests may first be forwarded to an application or service outside of the operating system to identify the nameserver associated with the request. This application, which can execute as an agent for the coordination service, may then obtain the required IP address without using the operating system. In some examples, a computing element may use a combination of the operating system and the application, wherein the application may process a first portion of domain name requests, while the operating system may process default requests or another portion of the DNS requests. For example, the application may identify a DNS request, determine whether a rule exists in the application to handle the request, and either process the request in the application or forward the request to the operating system for processing.

In some implementations, coordination service 120 may provide configuration information to a computing element that permits that computing element to implement a local DNS server. For example, domain name requests with a particular domain may be directed to the local DNS, permitting the local DNS server to provide a secure response to a DNS request. In some examples, the DNS server may correspond to other computing elements in a private network. For example, computing elements within a private network may use a domain to communicate with one or more other computing elements in the private network. This may permit computing element 110, representing a user computer, to communicate with computing element 113, representing a server. When a DNS request is identified at computing element 110, the domain in the request can be comparted to the DNS configuration to determine whether the DNS request is processed locally or via an external DNS server. When the domain corresponds to the local DNS server, the request is resolved locally, and the IP address is provided to the requesting application. In some implementations, the IP address may correspond to a private IP address within a subnet for the private network. When a packet is communicated using the private IP address, computing element 110 may identify the destination address is in the private subnet and may encapsulate the packet using a public IP address corresponding to the desired destination. Specifically, the coordination service may provide communication information to computing system 110, wherein the communication information may be used in encapsulating packets with private destination addresses. The communication information may include public addressing information for the encapsulation header, encryption key information, or some other information. Thus, when an application on computing element 110 communicates a packet to computing element 113, a networking service on computing element 110 may identify the private IP address and translate the private IP address to a public IP address. Computing element 110 may then encapsulate the packet using the public IP address and forward the packet toward computing element 113.

In some implementations, when a DNS request is received, the rules associated with the DNS configuration can be tiered, such that each rule is compared to the domain in series. The first rule that applies to the domain may be used to select the DNS server to support the request. For example, a first rule may indicate that a first server should be used to resolve queries with one or more domains, while a second rule in the ordered list may indicate a second server that should be used to resolve queries with one or more additional domains.

Figure 2:
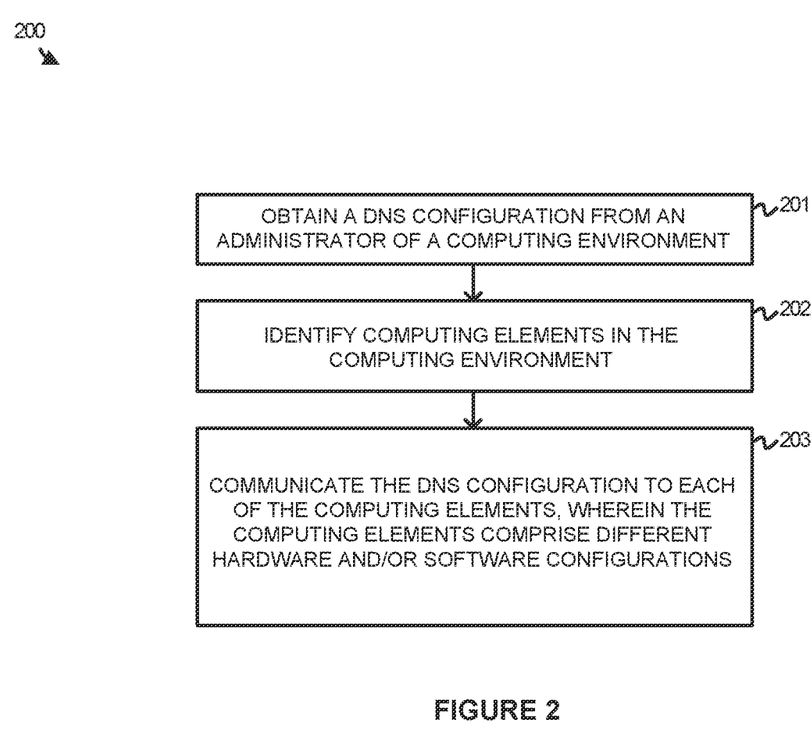
FIG. 2 illustrates an operation of a coordination service to provide a DNS configuration according to an implementation.

FIG. 2 illustrates an operation 200 of a coordination service to provide a DNS configuration according to an implementation. The steps of operation 200 are referenced parenthetically in the paragraphs that follow with reference to systems and elements of computing environment 100 of FIG. 1.

As depicted, operation 200 includes obtaining (201) a DNS configuration from an administrator of a computing environment, wherein the computing environment or network includes a plurality of computing elements. The computing elements may comprise physical computing systems or virtual computing systems. In obtaining the DNS configuration, a user may provide preferences or rules that associate nameservers with one or more domains. For example, an administrator may indicate that a first domain is associated with a first nameserver, while all remaining domains should be resolved using a second nameserver. The preferences provided by the user may be constructed into one or more files that comprise the DNS configuration that can be provided to the computing elements associated with the administrator.

Once the DNS configuration is obtained, operation 200 further includes identifying (202) computing elements in the computing environment and communicating (203) the DNS configuration to each of the computing elements, wherein the computing elements comprise different hardware and/or software configurations. In some implementations, computing elements may provide credentials to coordination service 120 to join services provided by the coordination service. The credentials may include usernames, passwords, tokens, or some other credential to be provided with at least a DNS configuration by coordination service 120. For example, computing element 110 may include a local application that communicates with coordination service 120 to obtain a DNS configuration, wherein the credentials may be based on the user of the computing element or the hardware and software configuration of the computing element. Once credentials are accepted, coordination service 120 may provide the DNS configuration associated with the credentials. After receiving the DNS configuration, computing element 110 may translate or map the rules in the DNS configuration to an implementation specific to the software and/or hardware configuration of the computing element.

In some examples, coordination service 120 may maintain multiple DNS configurations that can be provided to different computing elements based on the credentials provided. For example, when computing elements 110-113 request a DNS configuration, computing elements 110-111 may be provided with a different DNS configuration than computing elements 112-113. The different DNS configurations may be provided based on differences in users of the computing elements, hardware, and software configurations on the computing elements, or based on some other factor.

Figure 3:
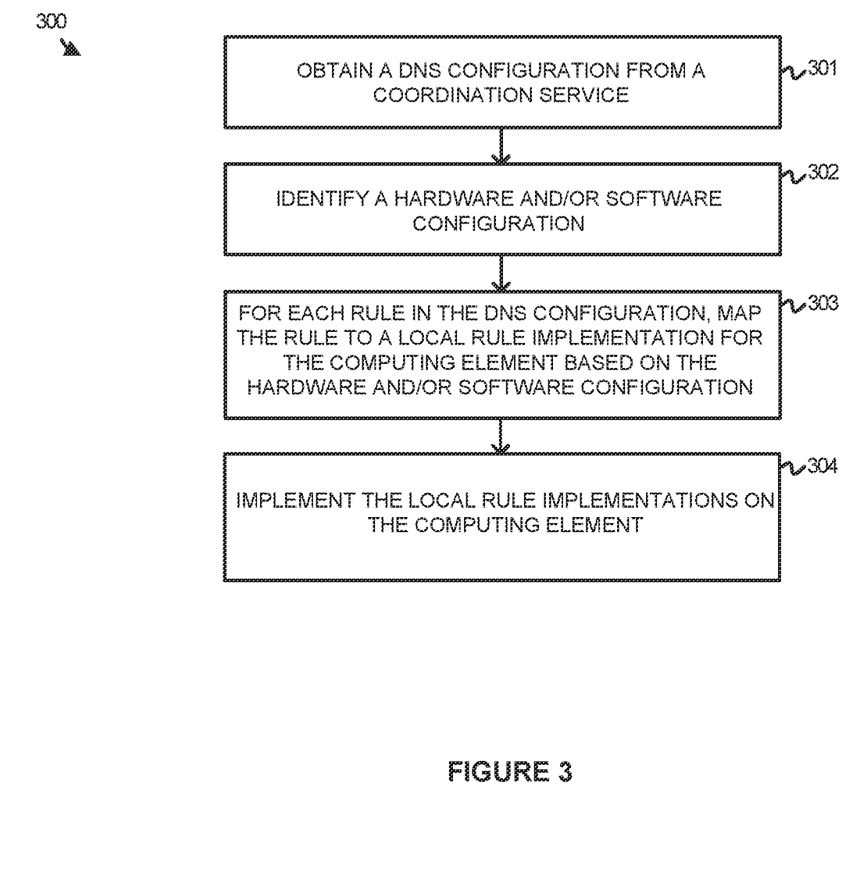
FIG. 3 illustrates an operation of a computing element to implement a DNS configuration according to an implementation.

FIG. 3 illustrates an operation 300 of a computing element to implement a DNS configuration according to an implementation. The steps of operation 300 are described parenthetically in the paragraphs that follow with reference to systems and elements of computing environment 100 of FIG. 1. Although demonstrated using computing element 110, computing elements 111-113 may perform similar operations.

As depicted, operation 300 includes obtaining (301) a DNS configuration from a coordination service. In some examples, the DNS configuration may be pushed to computing element 110 because of the computing element registering with coordination service 120. Once the DNS configuration is received, operation 300 further identifies (302) a hardware and/or software configuration associated with the computing the computing element. In some implementations, the hardware configuration may include a manufacturer of the device, processing system or memory system information, or some other hardware information. The software configuration may include operating system information, such as version and identifier, or some other software configuration information associated with the computing element. For each rule in the DNS configuration, operation 300 maps (303) the rule to a local rule implementation for the computing element based on the hardware and/or software configuration and applies (304) the local rule implementation on the computing element. In applying the local rule implementation, operation 300 may update the operating system, direct requests to an application providing DNS lookup operations on the computing element, update the application providing the DNS lookup operations on the computing element, or provide some other update to implement the rules locally at the computing element.

In some implementations, different operating systems may limit or change the DNS configuration is applied on the computing element. For example, a first operating system may permit changes in the operating system to direct different DNS requests to different nameservers. In contrast, a second operating system may prevent changes in the operating system to direct DNS requests and may instead require another application on the computing element to implement the DNS configuration. The other application may include the application that requests the DNS configuration from the coordination service. In some examples, a combination of the application and the operating system may be used to process the DNS requests. Specifically, DNS requests may first be provided to the application and the application may determine whether it includes an available rule to process the request. If a rule is not available, then the application may forward the request to the operating system for processing. Advantageously, while some rules from the DNS configuration may be processed within the application in communication with the coordination service, one or more other rules, such as default rules for DNS requests that don't include a domain associated with a specific nameserver.

In some implementations, when the DNS configuration is generated by an administrator, the administrator may define domains that are associated with specific nameservers. These nameservers may be private to an organization, unique a subset of end users, or some other specific nameservers. For example, an administrator may indicate that any DNS request with "www.example.com" she be directed to a first nameserver, while any requests associated "www.beta.com" are directed to a second nameserver. Additionally, the administrator may indicate that for any other domain, the default settings of the computing element should be used to resolve the DNS request. Thus, while a first computing element may use a first default configuration, determined at the local computing element, a second computing element may use a second default configuration, which may use different external resolvers and nameservers.

In some examples, a DNS configuration may permit a DNS server to be implemented locally on the computing system. Specifically, when a request is generated with a domain, the request can be resolved or responded to using a local server or database maintained at the computing element. In some implementations, the local DNS server can be used to provide addresses associated with a private network. Referring to an example in computing environment 100, a local DNS server may be used to direct communications to other computing elements on the same private network. Thus, when a query is for a domain associated with the private network, an address can be provided in association with the private network or subnet for the private network. When a query is not directed at a domain maintained locally at the computing element, the query can be forwarded to another DNS server, wherein the DNS server may provide an IP address for the desired computing system.

In some implementations, when a private IP address if provided as part of a private network (e.g., private address for computing element 113 in the private network), the application may use the private IP address to communicate with computing element 113. A service on computing element 110 may identify the use of the private IP address and encapsulate the packet using information provided by coordination service 120. The information provided by coordination service 120 may be used to encapsulate the packet and forward the packet to the desired to destination computing element. The information may include public IP addressing associated with the private IP addressing, encryption information, or some other information. Once encapsulated, the packet can be communicated to the destination computing system.

Figure 4:
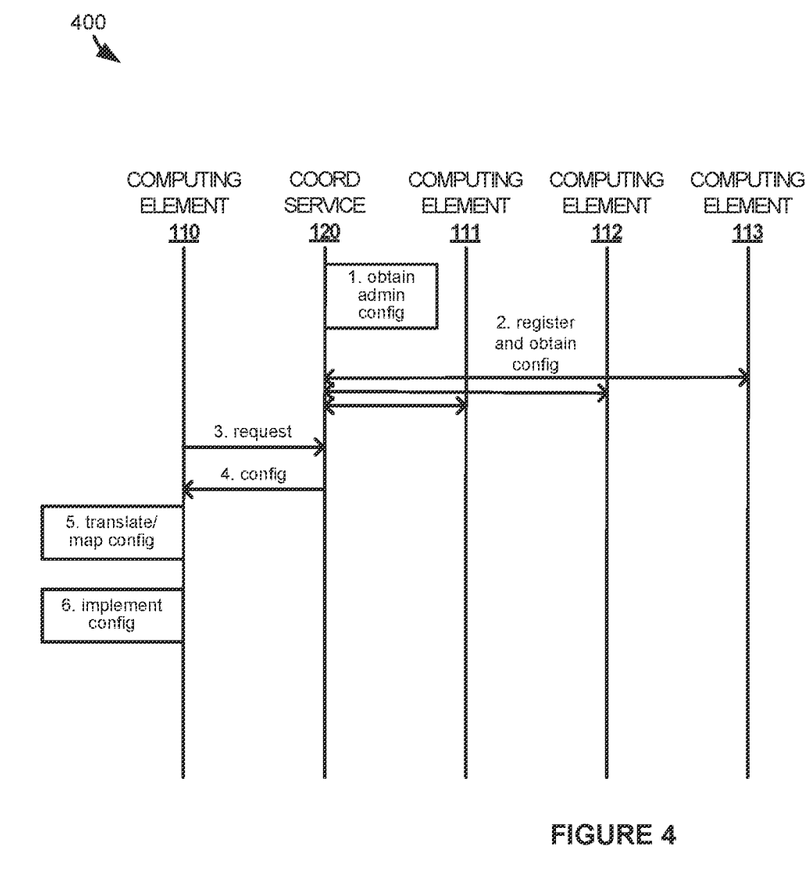
FIG. 4 illustrates a timing diagram of implementing a DNS configuration across multiple computing elements according to an implementation.

FIG. 4 illustrates a timing diagram 400 of implementing a DNS configuration across multiple computing elements according to an implementation. Timing diagram 400 includes computing elements 110-113 and coordination service 120.

As depicted, coordination service 120 identifies, at step 1, a DNS configuration based on administrator input, wherein the administrator may define rules that associate domains with nameservers. Each rule may associate a domain with one or more nameservers, wherein the one or more nameservers associated with the domain may be organized in a hierarchy, such that a request may be attempted to be resolved using a first nameserver, then may be directed to subsequent nameservers if the request cannot be resolved using the first nameserver.

After a DNS configuration is identified, computing elements 111-113 may register and obtain the DNS configuration at step 2. In some implementations, computing elements 111-113 may provide credentials to coordination service 120 to identify the user and/or device type information. Once the credentials are received, coordination service 120 may determine whether the credentials are approved, and a DNS configuration associated with the credentials. The identified DNS configuration is then supplied to the requesting computing elements for implementation. The implementation or application of the DNS configuration may be based on the hardware and/or software configuration of each computing element, wherein different portions of the DNS configuration may be applied in the operating system, in the application working with the coordination service, or in some combination of the two. For example, while a first portion of the DNS configuration rules may be implemented in the application, a second portion of the DNS configuration rules may be implemented using the operating system.

Here, after computing elements 111-113 implement the DNS configuration, computing element 100 further requests and receives the DNS request at steps 3 and 4. In response to receiving the DNS configuration, a local application on computing element 110 may identify at least operating configuration information for computing element 110 and translate or map the DNS configuration to local rule implementations associated with the specific operating system configuration at step 5. The operating system configuration may include an identifier for the operating system, a version of the operating system, or some other information associated with the operating system. Based on the operating system configuration, each of the rules in the DNS configuration may be mapped to local rule implementations that permit the DNS configuration to be implemented on computing element 110. For example, a DNS configuration may include four rules that each associate a domain with a nameserver IP address, while a fifth rule may comprise a default rule for any DNS request with a domain that does not apply to the first four rules. As computing element 110 all five the rules may be implemented in an application outside of the operating system (e.g., the application that retrieved the DNS configuration), all five of the rules may be implemented in the operating system or may be implemented in some combination thereof. For example, the four domain specific rules may be implemented in the application, while the fifth rule may be implemented in the operating system. Where the rules are implemented on a computing element may be based on constraints associated with the operating system, wherein on a first computing element a first implementation may be used and a second computing element a second implementation can be used. In some examples, the computing element may maintain translation or mapping services that can map the rules to local rule implementations. The rule implementations may indicate where the rule should be active (application, operating system, etc.), the format for implementing the rule on the computing element, how to configure the rule in the application or operating system, or some other implementation definition for the rule. Once the implementations are identified for each of the rules, the implementations can be applied in the computing element at step 6.

In some implementations, rather than determining the how the DNS configuration will be implemented locally at the computing element, the computing element may provide coordination service 120 with information about the operating system configuration of the computing element. From the operating system configuration, coordination service 120 may map the DNS configuration to an implementation compatible with the computing element and provide the implementation back to the computing element. The implementation may indicate where each of the rules should be applied, the steps for configuring the operating system or application, or some other implementation information for the rules. Once provided, the computing element may apply the implementation to support the DNS requests on the computing element.

Although demonstrated as determining local rule implementations for a computing element based on the operating system configuration for the computing element, other factors may be used in addition to or in place of the operating system. These may include current firewall configurations or software on the computing element, hardware configurations, including network interfaces, or some other factor.

Figure 5:
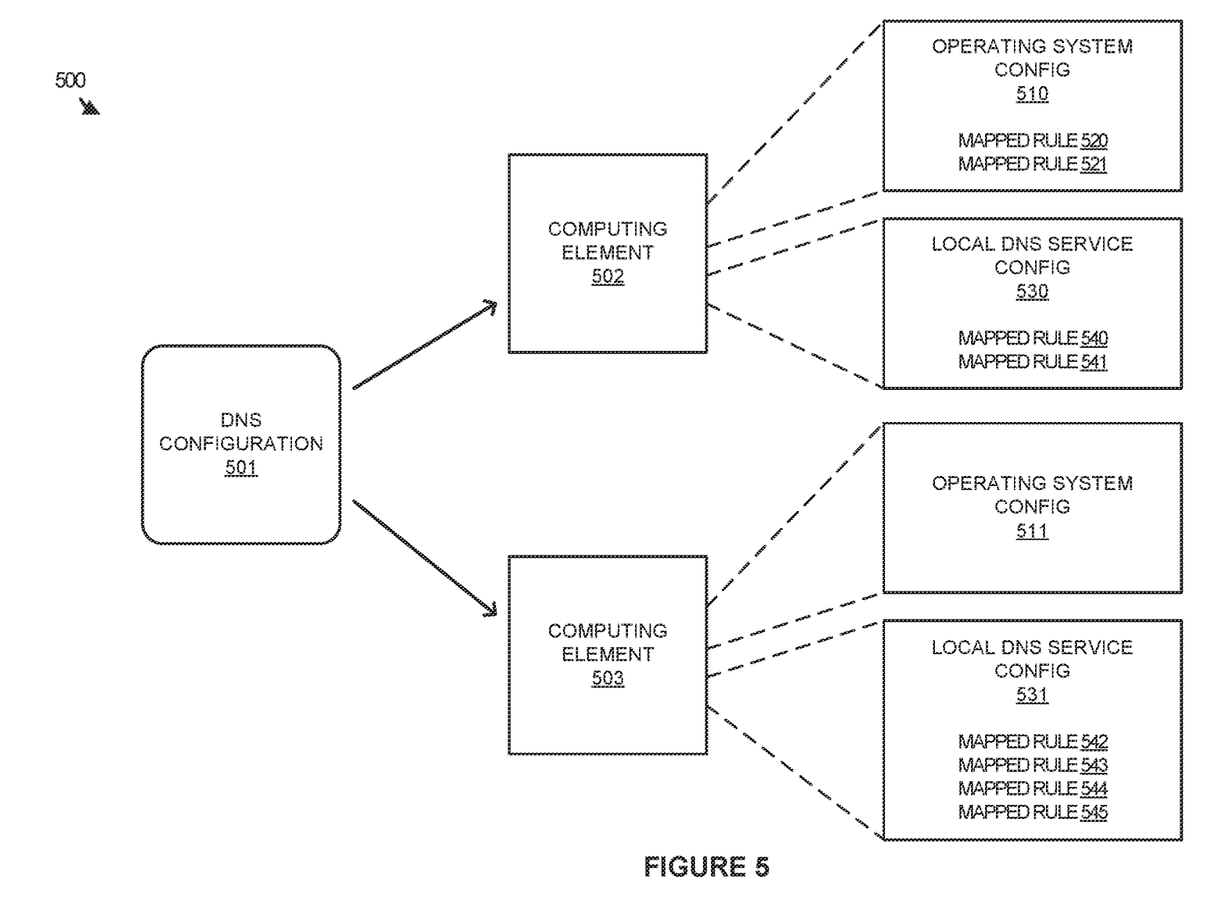
FIG. 5 illustrates an operational scenario of applying a DNS configuration across multiple computing elements according to an implementation.

FIG. 5 illustrates an operational scenario 500 of applying a DNS configuration across multiple computing elements according to an implementation. Operational scenario 500 includes DNS configuration 501 and computing elements 502-503. Computing elements 502-503 include corresponding operating system configurations 510-511 and DNS configurations 520-531. The configurations further include mapped rules 520-521 and 540-545 that are mapped from DNS configuration 501.

As described herein, an administrator may define a DNS configuration for multiple computing elements that comprise different hardware and/or software configurations. The DNS configuration includes multiple rules that are used to associate a domain name with an IP address for a nameserver to resolve DNS requests. Once generated, the DNS configuration may be distributed to the computing elements, permitting the computing elements to apply the DNS configuration. Here, DNS configuration 501 is provided to both computing elements 502-503, wherein the computing elements may belong to the same organization, workgroup, or some other device group allocated permissions to receive DNS configuration 501.

In response to receiving DNS configuration 501, each computing element of computing elements 502-503 may map each rule in the DNS configuration into a local implementation for the computing element based on software and/or hardware characteristics associated with the computing element. In some implementations, the mapping may be determined at least in part using an operating system configuration associated with the computing element. For example, computing element 502 may include a first operating system configuration that permits local rule implementations in both the operating system configuration 510 and a local DNS service configuration 530, wherein the local DNS service configuration comprises a service or application that executes outside of the operating system. In contrast, computing element 503 include a second operating system configuration that only permits a local DNS service or application to implement DNS configuration 501. This may be due to security limitations of the operating system, limitations to the DNS configuration capabilities of the operating system or for some other reason.

Referring to computing element 502, when DNS configuration 501 is received, computing element 502 may process the rules in the DNS configuration to determine how each of the rules will be implemented. The rule implementations may indicate where DNS requests with specific attributes are processed (i.e., in the DNS service application or the operating system), how the operating system or application should be configured, or some other implementation information. Two mapped rules 540-541 are determined to be processed as part of local DNS service configuration 530, while mapped rules 520-521 are implemented as part of operating system configuration 510. Similar operations are also performed at computing element 503, wherein mapped rules 542-545 are implemented as part of local DNS service configuration 531.

In some examples, the mapping may be accomplished using one or more data structures at the computing element, where the rules may be associated with implementation information for different operating system configurations. For example, when a first operating system configuration system is identified, rules that associate domains with nameservers may be implemented in the application or service. However, a default rule for DNS requests without the specific domain names may be processed by the operating system. Advantageously, a DNS configuration may permit a default configuration for the computing element for DNS requests that do not include specific domain names. For example, a DNS configuration may include four rules that associate DNS requests with four specific domain names to be routed to four specific nameservers, while a fifth rule may indicate that any other request should be processed using the local default DNS configuration. In this example, the first four rules may be implemented by DNS service or application, while the default rules may be processed by the operating system. Thus, when a DNS request is initiated on the computing element, the DNS request may be processed by the DNS service to determine whether a domain specific rule should be applied. If a rule applies, the DNS service may process the request and retrieve the IP address using the corresponding nameserver. In contrast, if a rule does not apply to the DNS request, the request may be forwarded to the operating system for processing and returning the requested IP address for the request. Although this is one example of dividing and applying the rules between an application and the operating system, the rules of a DNS configuration may be applied in various other ways on a computing element based on the operating system or other configuration of the computing element.

Figure 6:
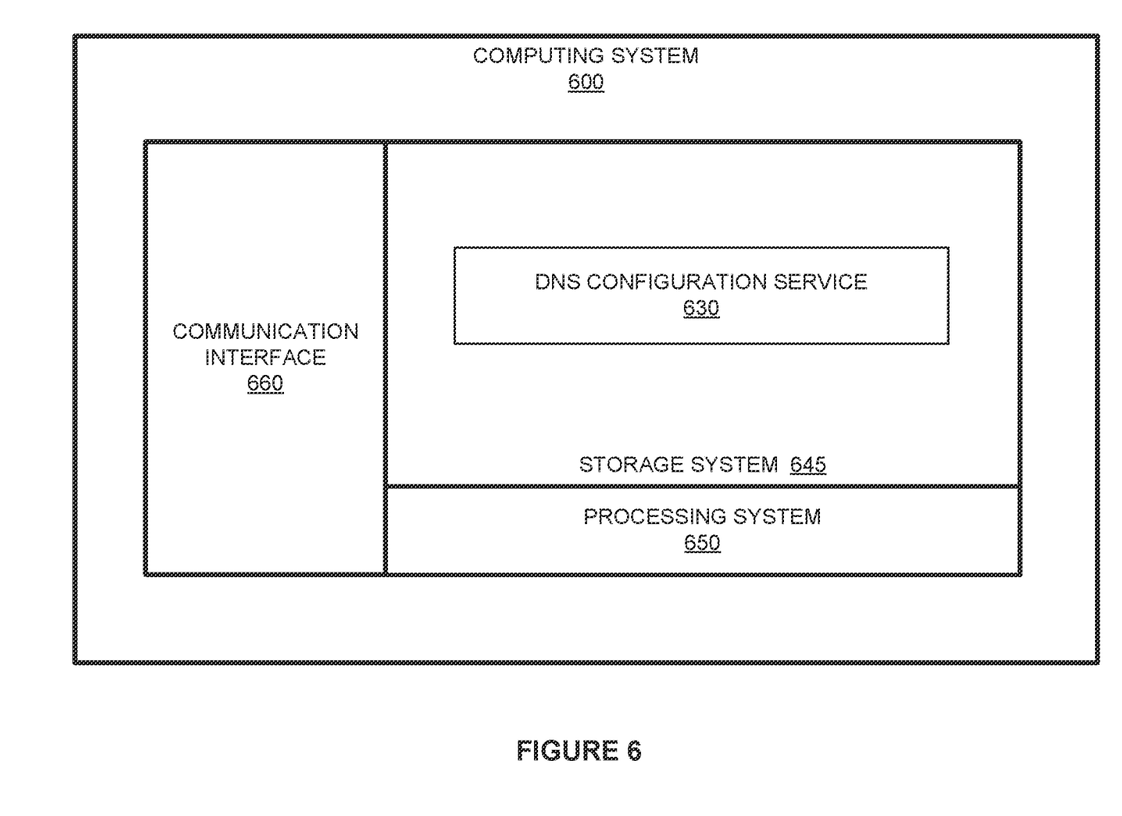
FIG. 6 illustrates a computing system to apply a DNS configuration from a coordination service according to an implementation.

FIG. 6 illustrates a computing system 600 to apply a DNS configuration from a coordination service according to an implementation. Computing system 600 is representative of any computing system or systems with which the various operational architectures, processes, scenarios, and sequences disclosed herein for a computing element can be implemented. Computing system 600 is an example computing element of private computing elements 110-113, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing systems and a coordination service to obtain a DNS configuration for the computing system 600.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises DNS configuration service 630 capable of providing at least operation 300 of FIG. 3. The operating software on storage system 645 may further include an operating system, utilities, drivers, network interfaces, applications, or some other type of software. When read and executed by processing system 650, the operating software on storage system 645 directs computing system 600 to operate as described herein.

In at least one implementation, DNS configuration service 630 directs processing system 650 to receive a DNS configuration from a coordination service, wherein the DNS configuration comprises a plurality of rules. In particular, the administrator may associate domain names in URL requests to a nameserver that can provide the IP address associated with the URL. DNS configuration service 630 further identifies an operating system configuration for computing system 600 and, for each rule of the plurality of rules in the DNS configuration, maps the rule to a local rule implementation for computing system 600 based on the operating system configuration. In some implementations, the local rule implementation may determine whether the rule is implemented in the operating system of computing system 600 or in a local DNS application. In some examples, the rules may require a combination of both. Once the local rule implementations are identified for the DNS configuration, DNS configuration service 630 applies the local rule implementations in computing system 600. The application may include updating the operating system, directing some or all DNS requests to the local DNS application that operates a local DNS agent for the configuration service, or some other configuration modification. In some examples, the mapping of the rules to local rule implementations may further be based on the hardware configuration of computing system 600, including manufacturer, processing system, memory resources, or some other hardware configuration information.

Although described in the previous example as mapping the rules of the DNS configuration at the local computing system, in some examples, computing system 600 may provide the operating system software configuration and hardware configuration information to the coordination service. The coordination service may then translate the or map the rules of the DNS configuration to local rule implementations for computing system 600. Once identified, the coordination service may forward the local rule implementations to computing system 600 to be implemented.

Figure 7:
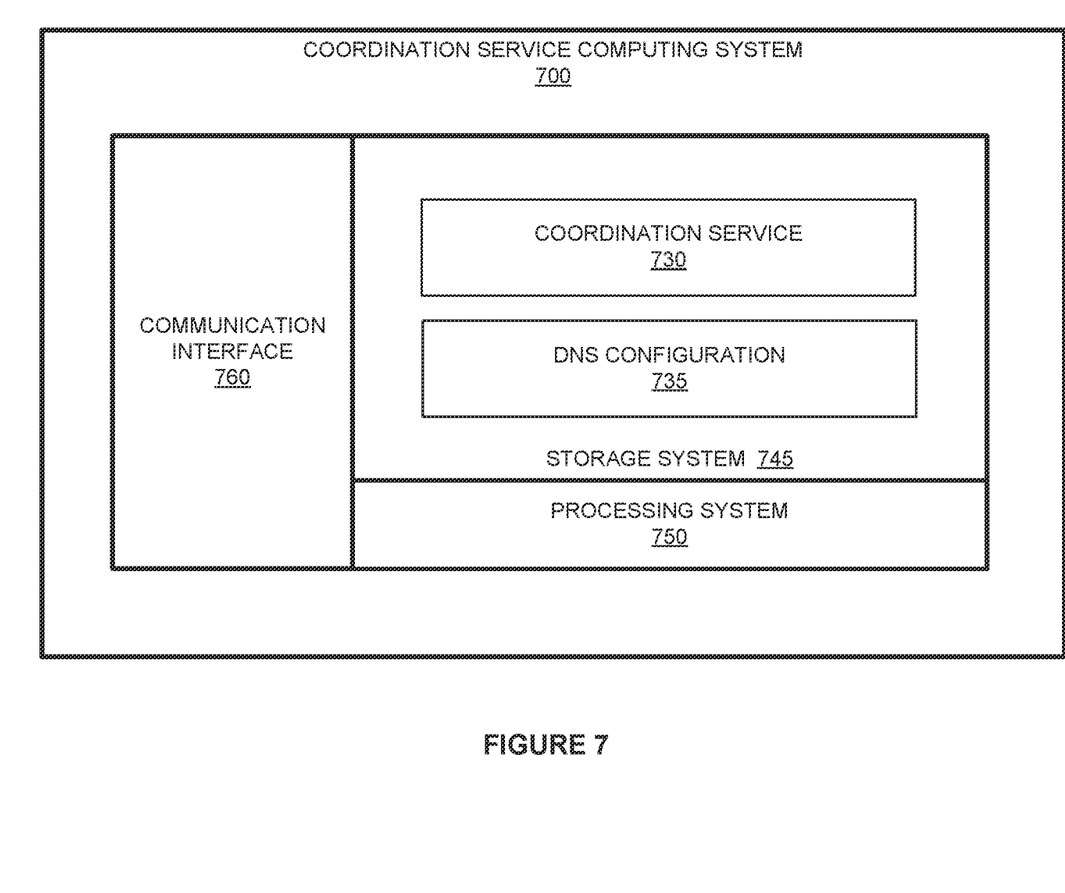
FIG. 7 illustrates a coordination service computing system to generate and provide a DNS configuration according to an implementation.

FIG. 7 illustrates a coordination service computing system 700 to generate and provide a DNS configuration according to an implementation. Computing system 700 is representative of any computing system or systems with which the various operational architectures, processes, scenarios, and sequences disclosed herein for a coordination service can be implemented. Computing system 700 is an example of coordination service 120 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with physical and/or virtual computing elements in one or more private networks.

Processing system 750 comprises microprocessor and other circuitry that retrieves and executes operating software from storage system 745. Storage system 745 may include volatile and nonvolatile, removable, and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises coordination service 730 capable of providing at least operation 300 of FIG. 3. The operating software on storage system 745 may further include an operating system, utilities, drivers, network interfaces, applications, or some other type of software. When read and executed by processing system 750, the operating software on storage system 745 directs computing system 700 to operate as described herein.

In at least one implementation, coordination service 730 directs processing system 750 to receive DNS configuration 735 from an administrator of a computing environment, wherein the computing environment may include a plurality of computing elements, including user devices, servers, virtual machines, or some other computing element. DNS configuration 735 may indicate rules that specify nameservers associated with domain names. For example, a first domain may be directed to be resolved using a first nameserver at a first address, while a second domain may be directed to a second nameserver at a second address.

After obtaining the DNS configuration, coordination service 730 directs processing system 750 to receive a request for DNS configuration 735 from a computing element in the computing environment. In some examples, the computing element may provide credentials or a key that indicates the computing element has permissions to receive DNS configuration 735. The permissions may be received directly from the computing element or from a third-party verification service (e.g., Google™, Microsoft™, and the like). If the permissions correspond to DNS configuration 735, coordination service 730 may distribute DNS configuration 735 to the requesting computing element. This may permit the computing element to apply local rule implementations for the DNS configuration based on the software configuration and/or the hardware configuration of the computing element.

In some implementations, in addition to the request for DNS configuration 735, the requesting computing element may also provide software and/or hardware configuration information to computing system 700. In response to receiving the information, coordination service 730 can direct processing system 750 to translate or map the rules in DNS configuration 735 to local implementations for the software and/or hardware configurations of the requesting computing element. Once mapped, the local implementations can be communicated to the computing element for implementation in the computing element.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   receiving a domain name system (DNS) configuration from a coordination service at a computing element, wherein the DNS configuration comprises a plurality of rules, and wherein each rule or the plurality of rules associates at least one domain name with a nameserver of a plurality of nameservers;
   identifying an operating system configuration on the computing element;
   for each rule of the plurality of rules in the DNS configuration, mapping the rule to a local rule implementation for the computing element based on the operating system configuration on the computing element, wherein each local rule implementation indicates whether the rule should be implemented in an operating system for the computing element or a DNS application separate from the operating system on the computing element based on the operating system configuration; and
   applying the local rule implementations in the computing element.

2. The method of claim 1, wherein the operating system configuration comprises an operating system identifier and version.

3. The method of claim 1 further comprising:
identifying hardware information associated with the computing element; and
wherein mapping the rule to a local rule implementation for the computing element is further based on the hardware information associated with the computing element.

4. The method of claim 1 further comprising:
identifying a second operating system configuration on a second computing element;
for each rule of the plurality of rules in the DNS configuration, mapping the rule to a local rule implementation for the second computing element based on the second operating system configuration for the second computing element; and
applying the local rule implementations mapped for the second computing element in the second computing element, wherein at least one of the local rule implementations mapped for the second computing element differ from the local rule implementations mapped for the computing element.

5. The method of claim 4 further comprising:
receiving the DNS configuration from the coordination service at the second computing element.

6. The method of claim 1 further comprising:
in the coordination service, receiving input indicative of the plurality of rules;
determining that the plurality of rules satisfy at least one criterion associated with operating system configurations in a computing environment; and
in response to determining that the plurality of rules satisfy the at least one criterion, generating the DNS configuration based on the input.

7. A computing apparatus comprising:
a storage system;
a processing system operatively coupled to the storage system; and
program instructions stored on the storage system that, when executed by the processing system, direct the computing apparatus to:
receive a domain name system (DNS) configuration from a coordination service at a computing element, wherein the DNS configuration comprises a plurality of rules, and wherein each rule or the plurality of rules associates at least one domain name with a nameserver of a plurality of nameservers;
identify an operating system configuration on the computing element;
for each rule of the plurality of rules in the DNS configuration, map the rule to a local rule implementation for the computing element based on the operating system configuration on the computing element, wherein each local rule implementation indicates whether the rule should be implemented in an operating system for the computing element or a DNS application separate from the operating system on the computing element based on the operating system configuration; and
apply the local rule implementations in the computing element.

8. The computing apparatus of claim 7, wherein the operating system configuration comprises an operating system identifier and version.

9. The computing apparatus of claim 7, wherein the program instructions further direct the computing apparatus to:
identifying hardware information associated with the computing element; and
wherein mapping the rule to a local rule implementation for the computing element is further based on the hardware information associated with the computing element.

10. The computing apparatus of claim 7, wherein the program instructions further direct the computing apparatus to:
identify a second operating system configuration on a second computing element;
for each rule of the plurality of rules in the DNS configuration, map the rule to a local rule implementation for the second computing element based on the second operating system configuration for the second computing element; and
apply the local rule implementations mapped for the second computing element in the second computing element, wherein at least one of the local rule implementations mapped for the second computing element differ from the local rule implementations mapped for the computing element.

11. The computing apparatus of claim 10, wherein the program instructions further direct the computing apparatus to:
receive the DNS configuration from the coordination service at the second computing element.

12. A system comprising:
a plurality of computing systems; and
a coordination service computing system;
a first computing system of the plurality of computing systems configured to:
receive a domain name system (DNS) configuration from a coordination service, wherein the DNS configuration comprises a plurality of rules, and wherein each rule or the plurality of rules associates at least one domain name with a nameserver of a plurality of nameservers;
identify an operating system configuration on the first computing system;
for each rule of the plurality of rules in the DNS configuration, map the rule to a local rule implementation for the first computing system based on the operating system configuration on the first computing system, wherein each local rule implementation indicates whether the rule should be implemented in an operating system for the first computing system or a DNS application separate from the operating system on the first computing system based on the operating system configuration; and
apply the local rule implementations in the computing system.

13. The system of claim 12, wherein a second computing system of the plurality of computing systems is further configured to:
receive the DNS configuration from the coordination service;
identify an operating system configuration for the second computing system;
for each rule of the plurality of rules in the DNS configuration, map the rule to a local rule implementation for the second computing system based on the operating system configuration on the second computing system; and
apply the local rule implementation for the second computing system in the second computing system.

14. The system of claim 12, wherein coordination service computing system is further configured to:
- receive input indicative of the plurality of rules;
- determine that the plurality of rules satisfy at least one criterion associated with operating system configurations in a computing environment; and
- in response to determining that the plurality of rules satisfy the at least one criterion, generate the DNS configuration based on the input.

* * * * *